US012748456B2

(12) United States Patent
Yao

(10) Patent No.: US 12,748,456 B2
(45) Date of Patent: Sep. 29, 2026

(54) ELECTRONIC DEVICE

(71) Applicant: VIVO MOBILE COMMUNICATION CO., LTD., Guangdong (CN)

(72) Inventor: Qi Yao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 19/031,806

(22) Filed: Jan. 18, 2025

(65) Prior Publication Data

US 2025/0165028 A1 May 22, 2025

Related U.S. Application Data

(63) Continuation of application No. PCT/CN2023/111219, filed on Aug. 4, 2023.

(30) Foreign Application Priority Data

Aug. 8, 2022 (CN) ........................ 202210945780.1

(51) Int. Cl.
*G06V 40/13* (2022.01)
*G06F 1/16* (2006.01)

(52) U.S. Cl.
CPC ........ *G06F 1/1605* (2013.01); *G06V 40/1318* (2022.01)

(58) Field of Classification Search
None
See application file for complete search history.

(56) References Cited

U.S. PATENT DOCUMENTS

| | | | | |
|---|---|---|---|---|
| 11,061,437 | B2 * | 7/2021 | Han | H04M 1/022 |
| 2011/0314742 | A1 * | 12/2011 | Hsu | G03B 9/08 49/358 |
| 2012/0082447 | A1 * | 4/2012 | Jung | G03B 11/00 359/227 |
| 2020/0409234 | A1 * | 12/2020 | Jun | G03B 30/00 |

(Continued)

FOREIGN PATENT DOCUMENTS

| | | | |
|---|---|---|---|
| CN | 202748581 U | * | 2/2013 |
| CN | 111785159 A | | 10/2020 |

(Continued)

OTHER PUBLICATIONS

Machine Translation of CN-202748581-U (Year: 2013).*

(Continued)

*Primary Examiner* — Joseph R Haley

(74) *Attorney, Agent, or Firm* — BROOKS KUSHMAN P.C.

(57) ABSTRACT

An electronic device including a first housing; a second housing, rotatably connected to the first housing, to enable the electronic device to switch between a folded state and an unfolded state; a first display, which can be folded or unfolded with relative rotation of the first housing and the second housing; a second display, disposed on a side, opposite to the first display, of the second housing, where both the first display and the second display are provided with light-transmitting areas; a fingerprint module, disposed in the first housing; and a dimming module, disposed in the second housing and located between the light-transmitting area of the first display and the light-transmitting area of the second display.

11 Claims, 9 Drawing Sheets

(56) References Cited

U.S. PATENT DOCUMENTS

| | | | |
|---|---|---|---|
| 2021/0004558 A1 | 1/2021 | Zeng et al. | |
| 2021/0133421 A1 | 5/2021 | Zeng et al. | |
| 2022/0374054 A1* | 11/2022 | Heo | G06F 1/1681 |
| 2024/0098166 A1 | 3/2024 | Li et al. | |

FOREIGN PATENT DOCUMENTS

| | | |
|---|---|---|
| CN | 113014766 A | 6/2021 |
| CN | 115359517 A | 11/2022 |
| WO | 2021209057 A1 | 10/2021 |
| WO | 2022142704 A1 | 7/2022 |

OTHER PUBLICATIONS

International Search Report and Written Opinion for PCT Application No. PCT/CN2023/111219, Mailed Oct. 24, 2023, 15 pages.

* cited by examiner

ELECTRONIC DEVICE

CROSS-REFERENCE TO RELATED APPLICATIONS

This application is a continuation of International Application No. PCT/CN2023/111219 filed on Aug. 4, 2023, which claims priority to Chinese Patent Application No. 202210945780.1 filed on Aug. 8, 2022, which are incorporated herein by reference in their entireties.

TECHNICAL FIELD

This application pertains to the field of communication device technologies, and specifically relates to an electronic device.

BACKGROUND

With continuous development of technologies, to improve use experience when a user watches videos and plays games, a screen size of an electronic device is designed to be increasingly large. However, an increase in the screen size also means an increase in a size of the whole device, which results in poor portability of the electronic device. In this regard, the industry considers requirements of the foregoing two aspects by using a foldable screen technology.

In a related technology, an electronic device has a foldable screen and a cover display. In an unfolded state, the foldable screen of the electronic device can be used, and in a folded state, the cover display of the electronic device can be used. In the electronic device that uses an under-display fingerprint unlocking solution, under-display fingerprint modules need to be disposed on lower sides of both the foldable screen and the cover display. Consequently, this structure layout apparently complicates a structure of the electronic device.

SUMMARY

An objective of embodiments of this application is to provide an electronic device.

Embodiments of this application provide an electronic device. The device includes: a first housing; a second housing, rotatably connected to the first housing, to enable the electronic device to switch between a folded state and an unfolded state; a first display, where two ends of the first display are respectively connected to the first housing and the second housing, and can be folded or unfolded with relative rotation of the first housing and the second housing; a second display, disposed on a side, opposite to the first display, of the second housing, where both the first display and the second display are provided with light-transmitting areas; a fingerprint module, disposed in the first housing; and a dimming module, disposed in the second housing and located between the light-transmitting area of the first display and the light-transmitting area of the second display, where when the electronic device is in the unfolded state, the dimming module is in a light blocking state, and the fingerprint module performs fingerprint identification through the light-transmitting area of the first display; or when the electronic device is in the folded state, the dimming module is in a light-through state, and the fingerprint module performs fingerprint identification through the light-transmitting areas of the first display and the second display.

REFERENCE NUMERALS

Figure 1:
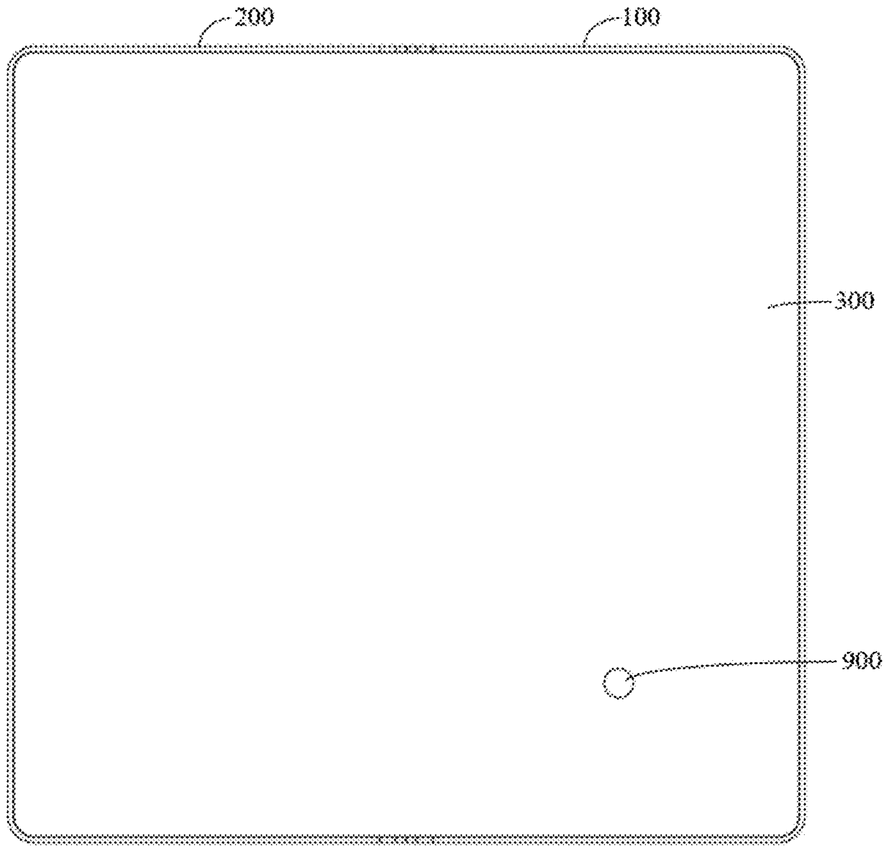
FIG. 1 and FIG. 2 are respectively schematic diagrams of structures of an electronic device in an unfolded state and a folded state according to an embodiment of this application.

- 100: first housing; 200: second housing; 210: first light-through hole;
- 300: first display; 310: first sub-screen; 320: second sub-screen;
- 400: second display; 500: fingerprint module;
- 600: dimming module; 610: substrate; 611: second light-through hole; 612: guide groove; 620: first driving assembly; 621: electrical heating component; 622: shape memory alloy part; 630: blade; 631: splicing corner; 632: fitting portion; 640: baffle; 641: rack portion; 650: second driving assembly; 651: electromagnet apparatus; 652: elastic member; 653: motor; 654: transmission gear;
- 700: light-transmitting support plate; 800: circuit board; 900: fingerprint identification area; 1000: rotating hinge.

DETAILED DESCRIPTION

The following clearly describes technical solutions in embodiments of this application with reference to accompanying drawings in embodiments of this application. Apparently, the described embodiments are some but not all of embodiments of this application. All other embodiments obtained by a person of ordinary skill based on embodiments of this application shall fall within the protection scope of this application.

The terms “first”, “second”, and the like in this specification and the claims of this application are used to distinguish between similar objects instead of describing a specific order or sequence. It should be understood that the terms used in such a way are interchangeable in proper circumstances, so that embodiments of this application can be implemented in an order other than the order illustrated or described herein. Objects classified by “first”, “second”, and the like are usually of a same type, and a quantity of objects is not limited. For example, there may be one or more first objects. In addition, in this specification and the claims, “and/or” indicates at least one of connected objects, and a character “/” generally indicates an “or” relationship between associated objects.

The technical solutions disclosed in embodiments of this application are described in detail below with reference to the accompanying drawings.

To resolve a technical problem in the related technology that under-display fingerprint modules need to be disposed on lower sides of both a foldable screen and a cover display of an electronic device, and consequently a structure is excessively complex, embodiments of this application provide an electronic device.

Refer to FIG. 1 to FIG. 16. The electronic device disclosed in embodiments of this application includes a first housing 100, a second housing 200, a first display 300, a second display 400, a fingerprint module 500, and a dimming module 600.

The first housing 100 and the second housing 200 are basic components of the electronic device, and can provide a mounting basis for components such as the first display 300, the second display 400, the fingerprint module 500, and the dimming module 600 in the electronic device.

The second housing 200 is rotatably connected to the first housing 100, that is, relative rotation can be generated between the first housing 100 and the second housing 200, so that the electronic device can switch between a folded state and an unfolded state. The electronic device may include a rotating hinge 1000, and the first housing 100 and the second housing 200 implement rotation fit through the rotating hinge 1000.

Two ends of the first display 300 are respectively connected to the first housing 100 and the second housing 200, and can be folded or unfolded with relative rotation of the first housing 100 and the second housing 200. The second display 400 is disposed on a side, opposite to the first display 300, of the second housing 200.

Specifically, the first display 300 is a flexible foldable screen of the electronic device, and relative to the first display 300, the second display 400 is a cover display of the electronic device. When the electronic device is in the unfolded state, a display area of the first display 300 is large, so that a requirement of a user for a large display is met; or when the electronic device is in the folded state, an overall size of the electronic device is small, so that a user can implement a display function of the electronic device through the second display 400, and it is convenient for the user to carry and hold the electronic device.

Figure 2:
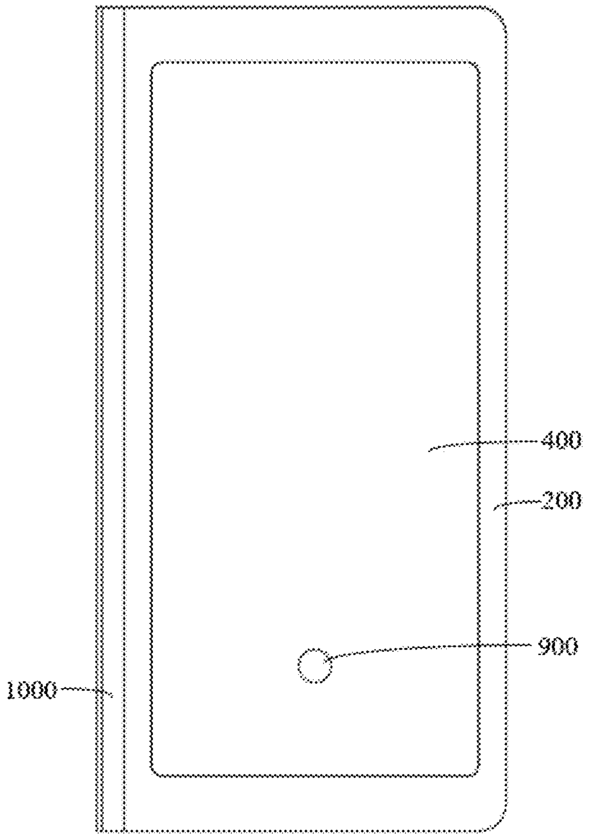
Figure 3:
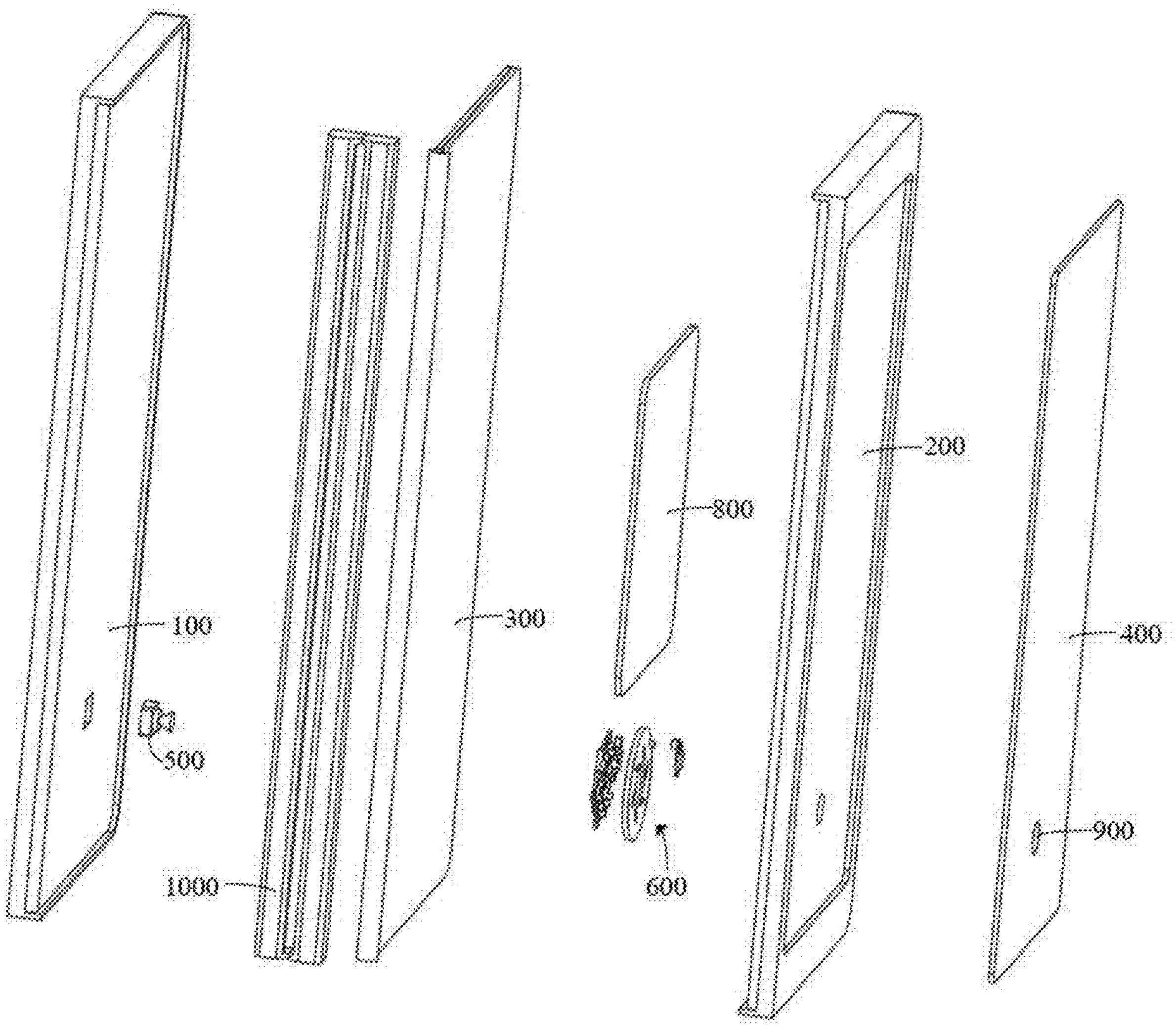
FIG. 3 is a first schematic diagram of an exploded structure of an electronic device according to an embodiment of this application.

In embodiments of this application, a specific included angle between the first housing 100 and the second housing 200 when the electronic device is in the unfolded state or the folded state is not limited. Optionally, when the electronic device is in the unfolded state, the included angle between the first housing 100 and the second housing 200 is 180°, as shown in FIG. 1; or when the electronic device is in the folded state, the included angle between the first housing 100 and the second housing 200 is 0°, as shown in FIG. 2.

The first display 300 may include a first sub-screen 310 and a second sub-screen 320, the first sub-screen 310 is correspondingly connected to the first housing 100, and the second sub-screen 320 is correspondingly connected to the second housing 200. In this layout, the first housing 100 is a carrier of the first sub-screen 310, and the second housing 200 is a carrier of the second sub-screen 320. When the first housing 100 and the second housing 200 are unfolded or folded, the first sub-screen 310 and the second sub-screen 320 may be driven to be unfolded or folded. The first sub-screen 310 and the second sub-screen 320 may be independently displayed.

The first display 300 may further include a third sub-screen, and the first sub-screen 310 is connected to the second sub-screen 320 through the third sub-screen, so that the first sub-screen 310, the second sub-screen 320, and the third sub-screen jointly form the complete display area of the first display 300. The third sub-screen corresponds to an area between the first housing 100 and the second housing 200, and specifically may correspond to the rotating hinge 1000, so that the third sub-screen is deformed in a process of folding the electronic device. The third sub-screen may be independently displayed.

In addition, both the first display 300 and the second display 400 are provided with light-transmitting areas; the fingerprint module 500 is disposed in the first housing 100; and the dimming module 600 is disposed in the second housing 200 and is located between the light-transmitting area of the first display 300 and the light-transmitting area of the second display 400, where when the electronic device is in the unfolded state, the dimming module 600 is in a light blocking state, and the fingerprint module 500 performs fingerprint identification through the light-transmitting area of the first display 300; or when the electronic device is in the folded state, the dimming module 600 is in a light-through state, and the fingerprint module 500 performs fingerprint identification through the light-transmitting areas of the first display 300 and the second display 400.

Specifically, in embodiments of this application, the electronic device uses an optical fingerprint identification technology. The optical fingerprint identification technology means that when a finger presses a fingerprint identification area of the display, a built-in module of the display emits light to illuminate the fingerprint identification area, the light illuminating a fingerprint is reflected and passes through the display, and is projected to a fingerprint sensor inside the electronic device, and the fingerprint sensor compares the reflected light with pre-entered fingerprint image information, to perform identification determining.

The dimming module 600 is configured to adjust a light-through amount, and may be connected to a circuit board 800 of the electronic device. The light-transmitting areas of the first display 300 and the second display 400 are used to transmit light, so that the light illuminating the fingerprint can be smoothly transmitted to the corresponding display after being reflected, to be projected to the fingerprint module 500 (namely, the fingerprint sensor) inside the electronic device. Both the first sub-screen 310 and the second sub-screen 320 of the first display 300 have light-transmitting areas, so that the dimming module 600 is located between the light-transmitting area of the second sub-screen 320 of the first display 300 and the light-transmitting area of the second display 400. To ensure that fingerprint light can be smoothly propagated, the second housing 200 may be provided with a first light-through hole 210 corresponding to the light-transmitting area and the dimming module 600.

As shown in FIG. 1, when the electronic device is in the unfolded state, the user uses the first display 300, and the user may press the fingerprint identification area 900 of the first display 300. The area corresponds to the fingerprint module 500, and the light illuminating may pass through the light-transmitting area of the first display 300 and is smoothly reflected to the fingerprint module 500 in the first housing 100, to implement fingerprint identification. It should be noted that the light blocking state of the dimming module 600 is a state in which light transmission is prevented, and the dimming module 600 is located between the light-transmitting area of the first display 300 and the light-transmitting area of the second display 400. When the electronic device is in the unfolded state, an area that is of the first display 300 and that corresponds to the dimming module 600 is a non-light-transmitting area, so that a light-transmitting difference occurred between the area and another area of the first display 300 can be avoided, that is, a "perspectivity" problem is avoided, to ensure that an overall screen of the first display 300 is consistent in color, and optimal display effect is achieved.

As shown in FIG. 2, when the electronic device is in the folded state, the first display 300 is folded inside the electronic device, and the second display 400 is located outside the electronic device, so that the user can use the second display 400, and the user can press the second display 400 in the fingerprint identification area 900 preset on the second display 400. In addition, when the electronic device is in the folded state, the light-transmitting area of the second display 400 is correspondingly disposed with two light-transmitting areas (the light-transmitting areas of the first sub-screen 310 and the second sub-screen 320) of the first display 300, and the dimming module 600 is in the light-through state, that is, the dimming module 600 allows the fingerprint light to pass through, so that the light illuminating the fingerprint can sequentially pass through the light-transmitting areas of the second display 400, the second sub-screen 320, and the first sub-screen 310 and is smoothly reflected to the fingerprint module 500 in the first housing 100, to implement fingerprint identification.

In comparison with a related technology, the electronic device in embodiments of this application can implement a dual-screen fingerprint identification function of the foldable electronic device by setting only one fingerprint module 500, thereby effectively simplifying a structure of the electronic device undoubtedly. Specifically, the electronic device in embodiments of this application can reduce a quantity of fingerprint modules 500, so that stacking space inside the electronic device can be saved, a circuit layout can be reduced, and costs can be further reduced, thereby implementing a light and thin design of the electronic device.

In embodiments of this application, there are a plurality of types of dimming modules 600. For example, the dimming module 600 is an electro-deformation assembly. When the electronic device is in the unfolded state, the electro-deformation assembly is in a colored state, thereby implementing light blocking; or when the electronic device is in the folded state, the electro-deformation assembly is in a transparent state, thereby implementing light-through.

In another implementation solution of the dimming module 600, as shown in FIG. 3 to FIG. 8, the dimming module 600 may include a first driving assembly 620 and a plurality of blades 630, the plurality of blades 630 are arranged along a circumferential direction of an optical path of fingerprint light and are all movably disposed in the second housing 200 between a first position and a second position, and when the plurality of blades 630 are in the first position, the plurality of blades 630 are spliced with each other to block the optical path; or when the plurality of blades 630 are in the second position, the plurality of blades 630 give way to the optical path; and the first driving assembly 620 is connected to the plurality of blades 630 and is configured to drive the plurality of blades 630 to move.

In this structure layout, the first driving assembly 620 is configured to drive the blade 630, to enable the blade 630 to move between the first position and the second position. When the plurality of blades 630 are in the first position, the plurality of blades 630 block the optical path, that is, light is prevented from being propagated, so that the dimming module 600 is in the light blocking state; or when the plurality of blades 630 are in the second position, the plurality of blades 630 all give way to the optical path, so that light can be smoothly propagated, and the dimming module 600 is in the light-through state.

In such a solution that the plurality of blades 630 are spliced, an area surrounded by the plurality of blades 630 may form an avoidance hole through which the fingerprint light can pass, and the avoidance hole may change a size by switching the blades 630 between the first position and the second position, thereby changing a light-through amount of the fingerprint light. Because in the solution that the plurality of blades 630 are spliced, it is determined that the blades 630 all approximately move along a radial direction, the avoidance hole is always on the optical path of the fingerprint light. In this way, even if the avoidance hole is small by driving the blades 630 to be spliced, it can still be ensured that the fingerprint light passes through the avoidance hole, thereby ensuring that the fingerprint identification function can be smoothly implemented. Certainly, when less fingerprint light passes through, sensitivity of the fingerprint identification function decreases.

It can be learned that, in the solution that the plurality of blades 630 are spliced in embodiments of this application, the light-through amount of the fingerprint light may be adjusted by adjusting the size of the avoidance hole, and propagation of the fingerprint light on the optical path of the fingerprint light can be ensured. Finally, sensitivity of the fingerprint identification function of the electronic device is adjusted, to meet requirements of different users.

In addition, the plurality of blades 630 in embodiments of this application are arranged along the circumferential direction of the optical path of the fingerprint light, so that an excessively large size of the electronic device in a single direction can be avoided, thereby optimizing an internal structure layout of the device.

Further, as shown in FIG. 4 to FIG. 8, the dimming module 600 may further include a substrate 610, a second light-through hole 611 is provided on the substrate 610, the second light-through hole 611 is correspondingly provided with the optical path, and the blade 630 is movably disposed on the substrate 610; and one of the blade 630 and the substrate 610 is provided with a guide groove 612, and the other is provided with a fitting portion 632, and the fitting portion 632 is movably disposed in the guide groove 612.

In this setting, the second light-through hole 611 may be used for light to pass through, so that it can be ensured that the optical path can be smoothly formed inside the dimming module 600 when the dimming module 600 is in the light-through state. The substrate 610 is a carrier, of the blade 630, that is movably disposed, and the substrate 610 is used as an independent structure, so that it is more convenient to process a fitting structure with the blade 630.

Figure 5:
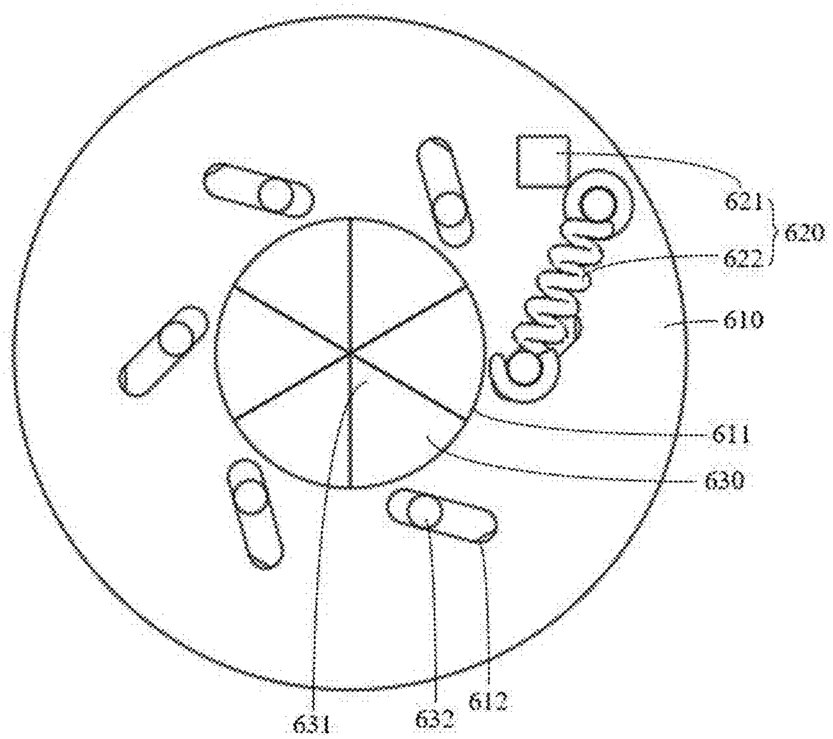
FIG. 5 and FIG. 6 are respectively a first top view and a first bottom view of blocking an optical path by a dimming module according to an embodiment of this application.
Figure 7:
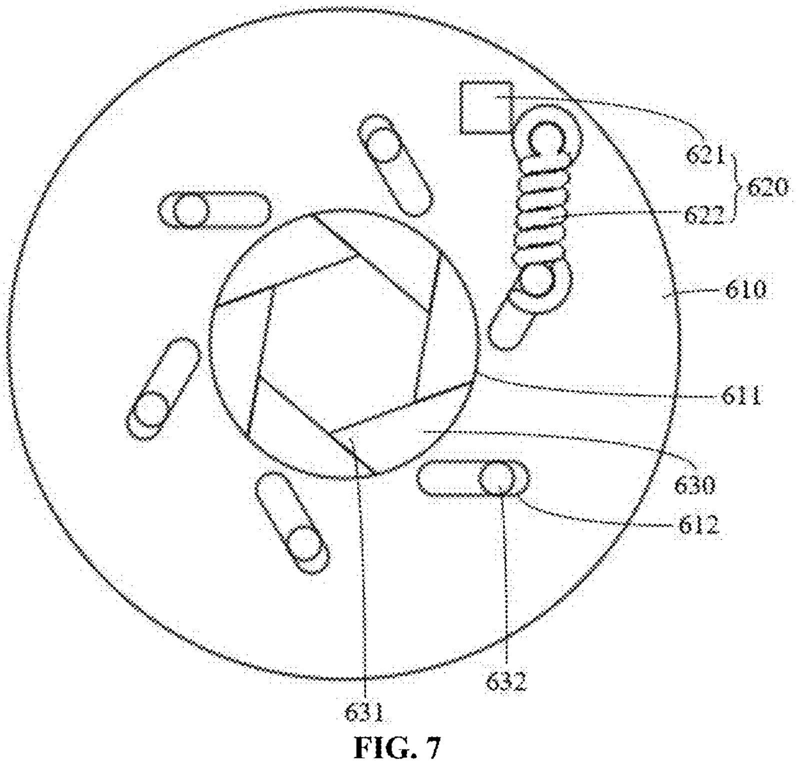
FIG. 7 and FIG. 8 are respectively a first top view and a first bottom view of giving way to an optical path by a dimming module according to an embodiment of this application.

As shown in FIG. 5 and FIG. 7, the fitting portion 632 is disposed on the blade 630, and the guide groove 612 is provided on the substrate 610. Certainly, the fitting portion 632 may be provided on the substrate 610, and the guide groove 612 is provided on the blade 630. Specific setting positions of the fitting portion 632 and the guide groove 612 are not limited in embodiments of this application. The fitting portion 632 is generally a protruding structure. It should be understood that a fitting relationship between the fitting portion 632 and the guide groove 612 not only implements a movable setting of the blade 630 on the substrate 610, but also implements a guide function of the guide groove 612 for a movement action of the blade 630 through the fitting portion 632, to ensure that the blade 630 can accurately move between the first position and the second position, thereby improving accuracy of a moving path of the blade 630 and stability of accurate switching of the dimming module 600 between the light blocking state and the light-through state.

In another implementation solution, the blade 630 in embodiments of this application may directly fit with the second housing 200 through guided movement, and the substrate 610 does not need to be disposed on the electronic device.

Further, as shown in FIG. 5 to FIG. 8, the blade 630 has a splicing corner 631, the blade 630 includes a first side wall and a second side wall located on both sides of the splicing corner 631, the blade 630 abuts against splicing corners 631 of two adjacent blades 630 through the first side wall and the second side wall respectively, and the first driving assembly 620 is connected to one of the blades 630; and when the first driving assembly 620 drives the blade 630 to move toward the first position, the blade 630 pushes the blade 630 that abuts against the first side wall of the blade 630 to block the optical path; or when the first driving assembly 620 drives the blade 630 to move toward the second position, the blade 630 pushes the blade 630 that abuts against the second side wall of the blade 630 to give way to the optical path.

It should be understood that the blades 630 may be spliced at a vertex of the splicing corner 631, so that the blades 630 are completely spliced around by one circle, thereby ensuring that the optical path of the light is completely blocked. Specifically, each of the blades 630 may abut against splicing corners 631 of two adjacent blades 630 through the first side wall and the second side wall, to be specific, along the circumferential direction of the optical path of the fingerprint light, the plurality of blades 630 are sequentially arranged, and each of the blades 630 abuts against the adjacent blades 630 through the first side wall and the second side wall respectively.

In a process in which the blade 630 is driven to move from the second position to the first position, the blade 630 pushes the adjacent blade 630 to move through the first side wall, so that all the blades 630 along the circumferential direction of the optical path of the fingerprint light move toward the first position, thereby implementing switching of the dimming module 600 from the light-through state to the light blocking state. In a process in which the blade 630 is driven to move from the first position to the second position, the blade 630 pushes the adjacent blade 630 to move through the second side wall, so that all the blades 630 along the circumferential direction of the optical path of the fingerprint light move toward the second position, thereby implementing switching of the dimming module 600 from the light blocking state to the light-through state.

Apparently, the first driving assembly 620 in embodiments of this application drives one blade 630, and then the blade 630 can drive all blades 630 to move. In comparison with those in a solution that each blade 630 is configured with one driving apparatus, costs and stacking space inside the electronic device are effectively saved.

Figure 6:
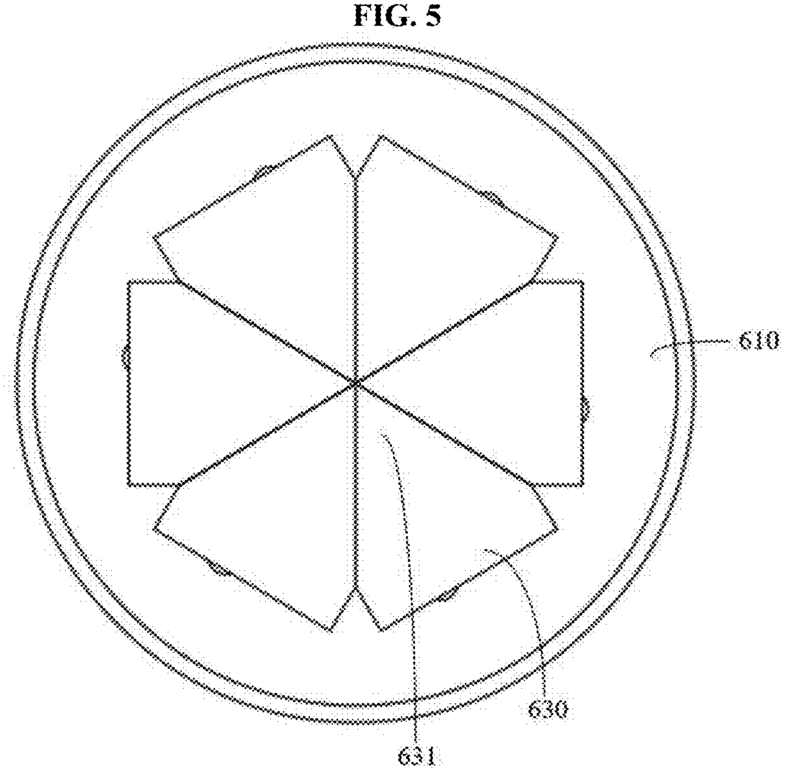
Figure 8:
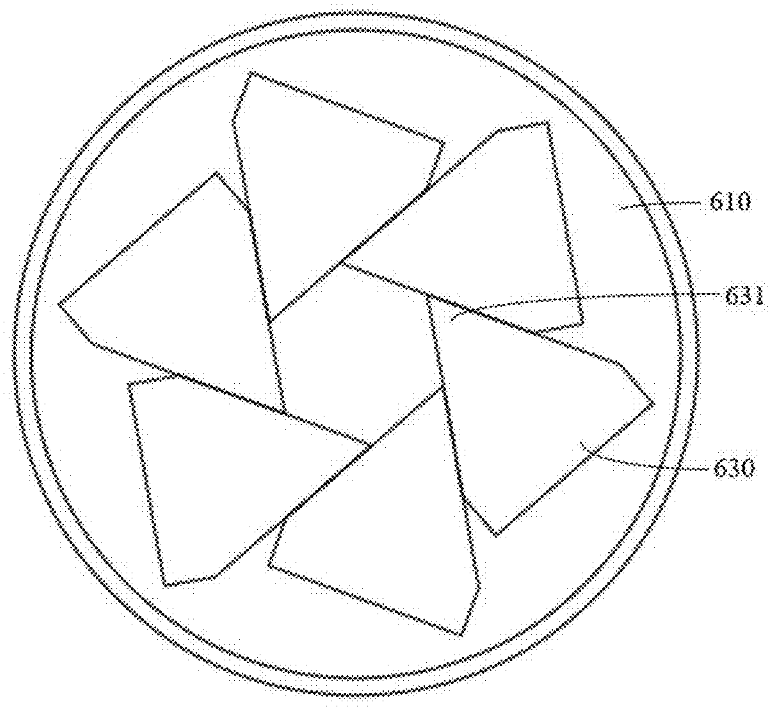
Figure 9:
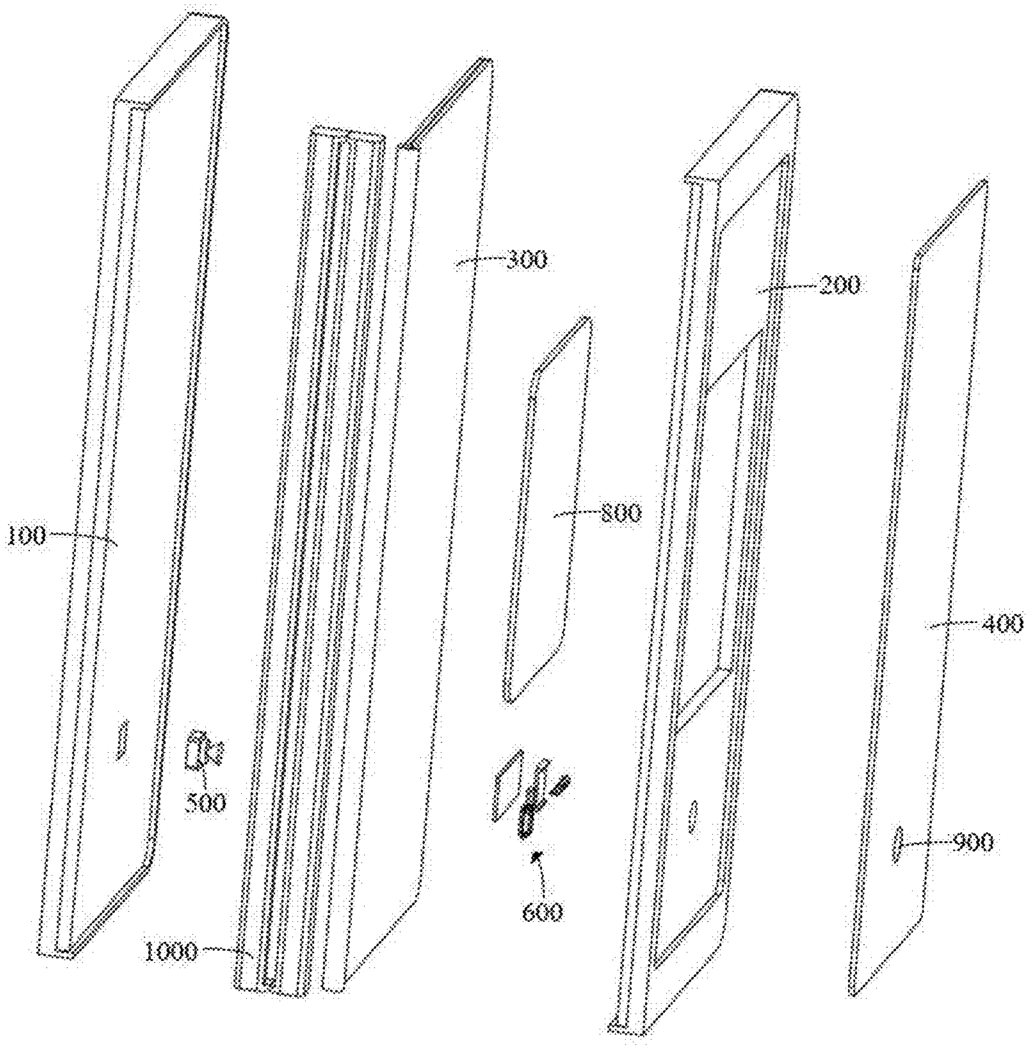
FIG. 9 is a second schematic diagram of an exploded structure of an electronic device according to an embodiment of this application.

In embodiments of this application, a quantity of blades 630 is not limited. As shown in FIG. 6 and FIG. 8, there may be six blades 630, or there may be another quantity of blades 630 such as four or five.

Figure 4:
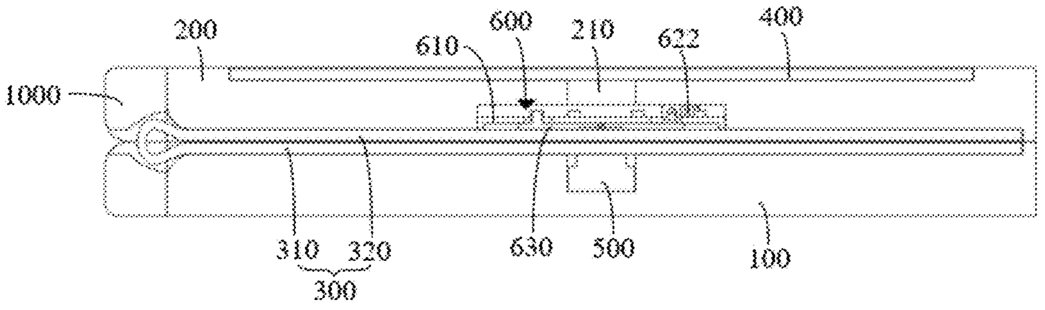
FIG. 4 is a first sectional view of an electronic device according to an embodiment of this application.

Further, as shown in FIG. 4, FIG. 5, and FIG. 7, the first driving assembly 620 is an electro-deformation assembly, and the electro-deformation assembly drives the blade 630 to move through telescopic deformation. It should be understood that, the electro-deformation assembly may conveniently implement a driving function for the blade 630 by powering on or off, thereby facilitating switching of the dimming module 600 between the light blocking state and the light-through state. A structure of the electro-deformation assembly is simple, and the internal structure layout of the electronic device can be simplified.

Certainly, a specific type of the first driving assembly 620 is not limited in embodiments of this application. For example, the first driving assembly 620 may be a linear motor 653, a hydraulic telescopic part, or the like.

The electro-deformation assembly may include an electrical heating component 621 and a shape memory alloy part 622, the electrical heating component 621 is configured to heat the shape memory alloy part 622, and the shape memory alloy part 622 is connected to the blade 630. In this layout, the electrical heating component 621 is an excitation component of the shape memory alloy part 622, and an excitation signal is sent to the electrical heating component 621, so that the electrical heating component 621 can transmit energy to the shape memory alloy part 622, and the shape memory alloy part 622 implements a telescopic action, to drive the blade 630 to move. The shape memory alloy part 622 may be a shape memory alloy wire.

In addition, the electro-deformation assembly may further be made of an electroactive polymer (EAP), a piezoelectric material, or the like.

In another implementation solution of the dimming module 600, as shown in FIG. 9 to FIG. 16, the dimming module 600 may include a baffle 640 and a second driving assembly 650, the baffle 640 is movably disposed in the second housing 200 between a third position and a fourth position, and when the baffle 640 is in the third position, the baffle 640 blocks the optical path of the fingerprint light; or when the baffle 640 is in the fourth position, the baffle 640 gives way to the optical path; and the second driving assembly 650 is connected to the baffle 640 and is configured to drive the baffle 640 to move.

In this implementation solution, the second driving assembly 650 is a driving apparatus corresponding to the baffle 640. In a process in which the baffle 640 is driven to move from the fourth position to the third position, the baffle 640 gradually blocks the optical path of the fingerprint light, thereby implementing switching of the dimming module 600 from the light-through state to the light blocking state. In a process in which the baffle 640 is driven to move from the third position to the fourth position, the baffle 640 gradually gives way to the optical path of the fingerprint light, thereby implementing switching of the dimming module 600 from the light blocking state to the light-through state. In this way, a structure of the driving solution through the driving baffle 640 is simple, and the internal structure layout of the electronic device can be simplified.

In a specific implementation solution of the second driving assembly 650, as shown in FIG. 9 to FIG. 12, the second driving assembly 650 may include an electromagnet apparatus 651 and an elastic member 652, the baffle 640 is a magnetic mechanical part, and the electromagnet apparatus 651 and the elastic member 652 are respectively disposed on two opposite sides of the baffle 640; and one of the electromagnet apparatus 651 and the elastic member 652 is configured to drive the baffle 640 to move to the third position, and the other is configured to drive the baffle 640 to move to the fourth position.

It should be understood that, because the baffle 640 is a magnetic mechanical part, when the electromagnet apparatus 651 is powered on, the electromagnet apparatus 651 implements a driving function for the baffle 640 by using a magnetic field force. The elastic member 652 may store energy when being compressed. In this case, a resilient force may be applied to the baffle 640. The elastic member 652 may store energy when being stretched. In this case, a pulling force may be applied to the baffle 640. In both the two states, a driving function may be applied to the baffle 640.

The electromagnet apparatus 651 can change a size of the driving function through powering-on strength. Therefore, it is more convenient to control adjustment accuracy, and a structure of the electromagnetic driving solution is simple.

Figure 10:
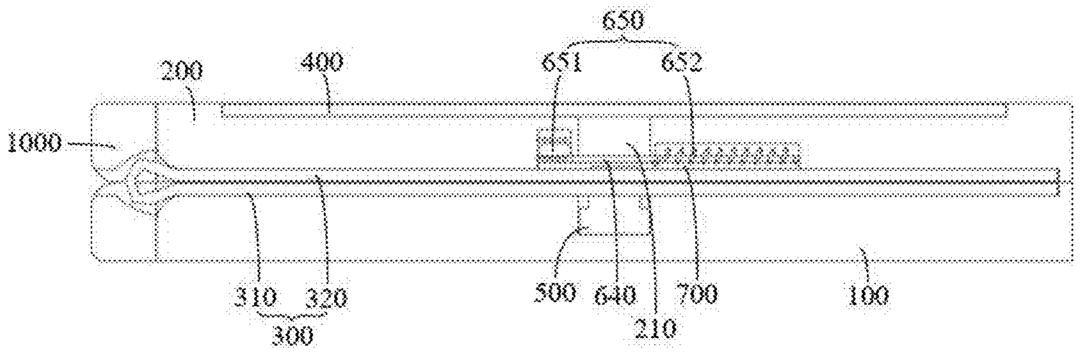
FIG. 10 is a second sectional view of an electronic device according to an embodiment of this application.
Figure 11:
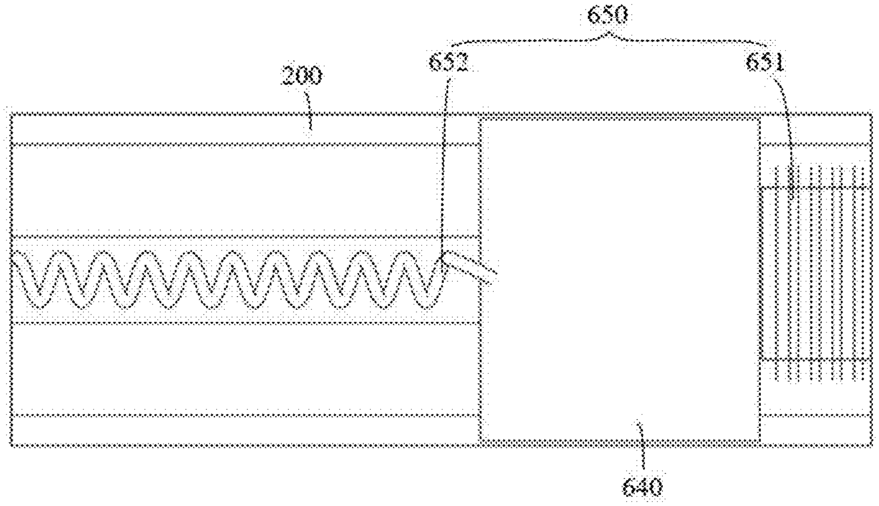
FIG. 11 is a second top view of blocking an optical path by a dimming module according to an embodiment of this application.
Figure 12:
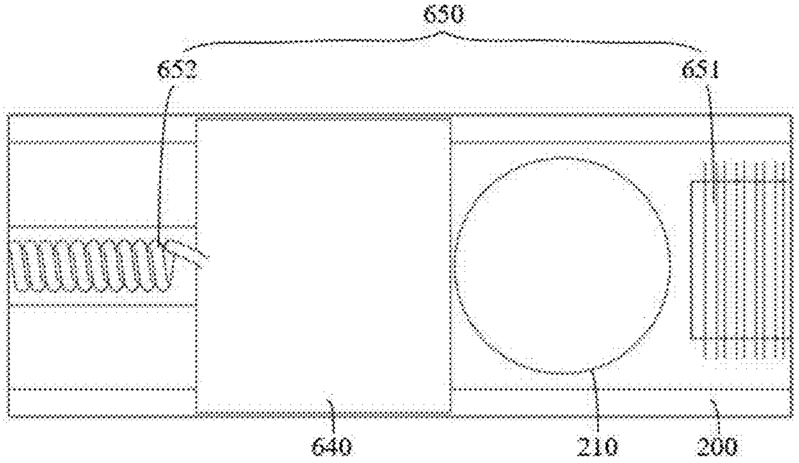
FIG. 12 is a second top view of giving way to an optical path by a dimming module according to an embodiment of this application.
Figure 13:
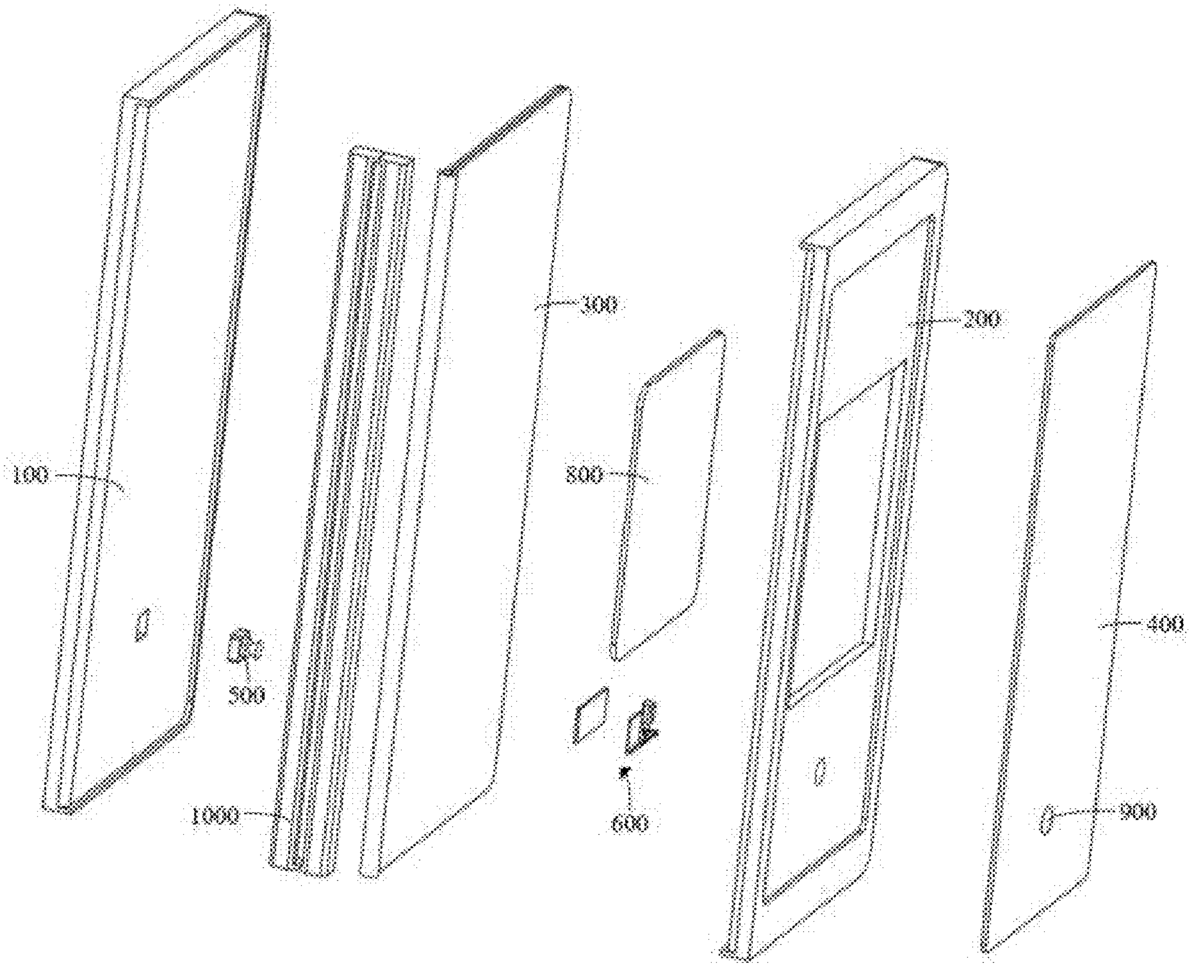
FIG. 13 is a third schematic diagram of an exploded structure of an electronic device according to an embodiment of this application.

In embodiments of this application, a specific driving relationship between each of the electromagnet apparatus 651 and the elastic member 652 and the baffle 640 is not limited. As shown in FIG. 10 to FIG. 12, the elastic member 652 may be selected as a spring, or the elastic member 652 may be foam, rubber, an elastic polymer material, or the like.

As shown in FIG. 11 and FIG. 12, when the electromagnet apparatus 651 is powered on, the electromagnet apparatus 651 applies an attraction force to the baffle 640 to drive the baffle 640 to move to the third position, and the elastic member 652 is in a stretched state and stores energy; or when the electromagnet apparatus 651 is powered off, the elastic member 652 retracts and releases energy to apply a pulling force to the baffle 640 to drive the baffle 640 to move to the fourth position.

In another implementation solution, when the electromagnet apparatus 651 is powered on, the electromagnet apparatus 651 may apply a repulsion force to the baffle 640 to drive the baffle 640 to move to the fourth position, and the elastic member 652 is in a compressed state and stores energy; or when the electromagnet apparatus is powered off, the elastic member 652 rebounds to extend and releases energy to apply a thrust force to the baffle 640 to drive the baffle 640 to move to the third position.

In another specific implementation solution of the second driving assembly 650, as shown in FIG. 13 to FIG. 16, the second driving assembly 650 may include a motor 653 and a transmission gear 654, the baffle 640 includes a rack portion 641 at one end, close to the motor 653, of the baffle 640, the transmission gear 654 is disposed at an output end of the motor 653, and the transmission gear 654 meshes with the rack portion 641.

It should be understood that the transmission gear 654 may rotate with the output end of the motor 653, and the rack portion 641 may move with the transmission gear 654, to drive the baffle 640 to move. Specifically, the baffle 640 may move between the third position and the fourth position by adjusting and controlling an output rotation direction of the motor 653 to be different. In the foregoing constructed gear-rack driving solution, the rack portion 641 moves in a straight line, so that relative rotation does not occur, thereby reducing a probability of interference with another component in a transmission process, and facilitating arrangement of another component in an internal environment of the device.

Figure 14:
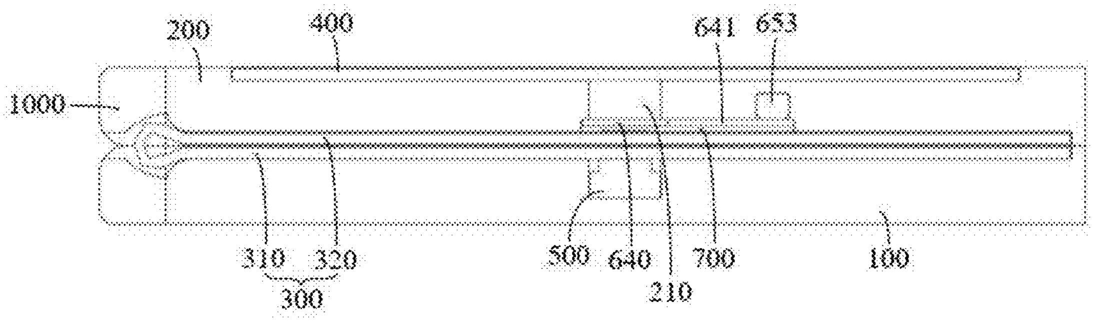
FIG. 14 is a third sectional view of an electronic device according to an embodiment of this application.
Figure 15:
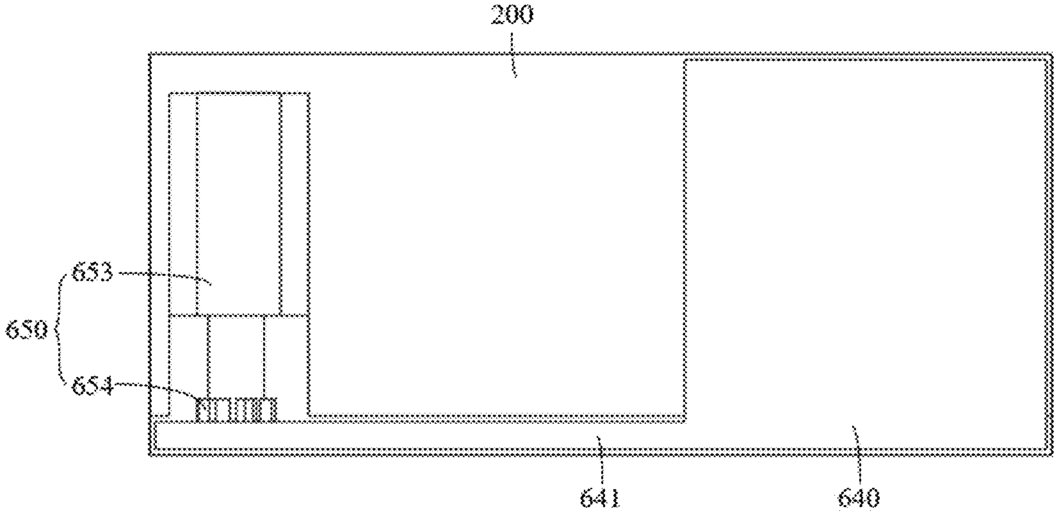
FIG. 15 is a third top view of blocking an optical path by a dimming module according to an embodiment of this application.
Figure 16:
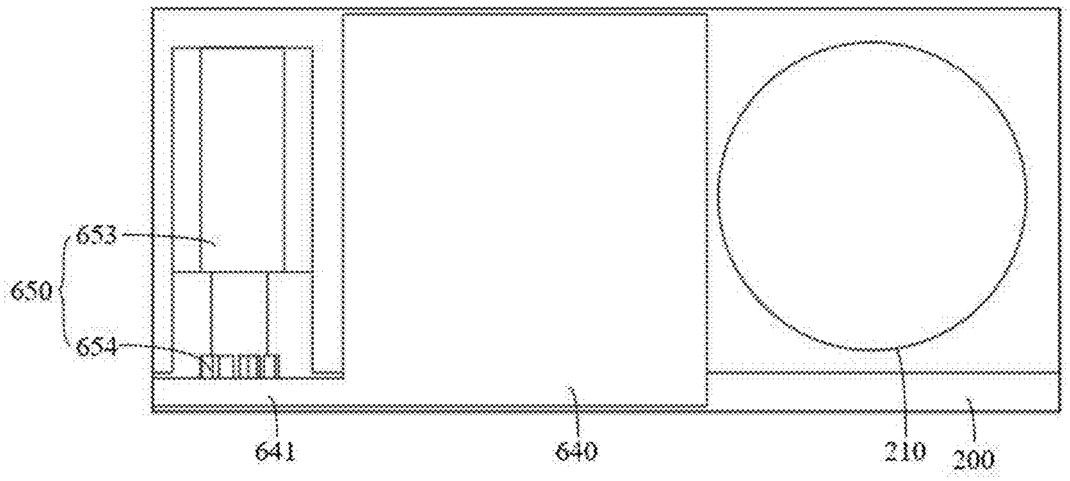
FIG. 16 is a third top view of giving way to an optical path by a dimming module according to an embodiment of this application.

In an optional solution, as shown in FIG. 10 and FIG. 14, the electronic device may further include a light-transmitting support plate 700, the light-transmitting support plate 700 is disposed in the second housing 200 and is located between the dimming module 600 and the first display 300, and the first display 300 is attached to the light-transmitting support plate 700.

It should be understood that the light-transmitting support plate 700 may transmit the fingerprint light, so that it can be ensured that the fingerprint identification function can be smoothly implemented. An area in which the dimming module 600 is located belongs to an area with relative weak strength inside the second housing 200. In this case, the light-transmitting support plate 700 may improve the strength of the area, to optimize structure stability of the electronic device. When the dimming module 600 is an implementation solution such as splicing the blades 630 or moving the baffle 640, when the dimming module 600 is in the light-through state, a support function of the blade 630 or the baffle 640 is weakened, and the light-transmitting support plate 700 may always implement a good support function for the first display 300. Even if the first display 300 is a flexible foldable screen, better structure stability can be ensured.

The electronic device disclosed in embodiments of this application may be a smartphone, a tablet computer, an e-book reader, a wearable device (for example, a smart watch), a video game console, or the like. A type of the electronic device is not specifically limited in embodiments of this application.

Embodiments of this application are described above with reference to the accompanying drawings, but this application is not limited to the foregoing specific implementations, and the foregoing specific implementations are merely examples, but are not limitative. Under the enlightenment of this application, a person of ordinary skill in the art may further make many forms without departing from the purpose of this application and the protection scope of the claims, and all the forms fall within the protection of this application.

What is claimed is:

1. An electronic device, comprising:

a first housing;

a second housing, rotatably connected to the first housing, to enable the electronic device to switch between a folded state and an unfolded state;

a first display, wherein two ends of the first display are respectively connected to the first housing and the second housing, and can be folded or unfolded with relative rotation of the first housing and the second housing;

a second display, disposed on a side, opposite to the first display, of the second housing, wherein both the first display and the second display are provided with light-transmitting areas;

a fingerprint module, disposed in the first housing; and a dimming module, disposed in the second housing and located between the light-transmitting area of the first display and the light-transmitting area of the second display, wherein when the electronic device is in the unfolded state, the dimming module is in a light blocking state, and the fingerprint module performs fingerprint identification through the light-transmitting area of the first display; when the electronic device is in the folded state, the dimming module is in a light-through state, and the fingerprint module performs fingerprint identification through the light-transmitting areas of the first display and the second display; and the fingerprint identification on the first display when the electronic device is in the unfolded state and the fingerprint identification on the second display when the electronic device is in the folded state are both achieved by a single fingerprint module.

2. The electronic device according to claim 1, wherein the dimming module comprises a first driving assembly and a plurality of blades, the plurality of blades are arranged along a circumferential direction of an optical path of fingerprint light and are all movably disposed in the second housing between a first position and a second position, and when the plurality of blades are in the first position, the plurality of blades are spliced with each other to block the optical path; when the plurality of blades are in the second position, the plurality of blades give way to the optical path; and the first driving assembly is connected to the plurality of blades and is configured to drive the plurality of blades to move.

3. The electronic device according to claim 2, wherein the dimming module further comprises a substrate, a second light-through hole is provided on the substrate, the second light-through hole is correspondingly provided with the optical path, and the blade is movably disposed on the substrate; and one of the blade and the substrate is provided with a guide groove, and the other is provided with a fitting portion, and the fitting portion is movably disposed in the guide groove.

4. The electronic device according to claim 2, wherein the blade has a splicing corner, the blade comprises a first side wall and a second side wall located on both sides of the splicing corner, the blade abuts against splicing corners of two adjacent blades through the first side wall and the second side wall respectively, and the first driving assembly is connected to one of the blades; and when the first driving assembly drives the blade to move toward the first position, the blade pushes the blade that abuts against the first side wall of the blade to block the optical path; when the first driving assembly drives the blade to move toward the second position, the blade pushes the blade that abuts against the second side wall of the blade to give way to the optical path.

5. The electronic device according to claim 4, wherein the first driving assembly is an electro-deformation assembly, and the electro-deformation assembly drives the blade to move through telescopic deformation.

6. The electronic device according to claim 5, wherein the electro-deformation assembly comprises an electrical heating component and a shape memory alloy part, the electrical heating component is configured to heat the shape memory alloy part, and the shape memory alloy part is connected to the blade.

7. The electronic device according to claim 1, wherein the dimming module comprises a baffle and a second driving assembly, the baffle is movably disposed in the second housing between a third position and a fourth position, and when the baffle is in the third position, the baffle blocks an optical path of fingerprint light; or when the baffle is in the fourth position, the baffle gives way to the optical path; and the second driving assembly is connected to the baffle and is configured to drive the baffle to move.

8. The electronic device according to claim 7, wherein the second driving assembly comprises an electromagnet apparatus and an elastic member, the baffle is a magnetic mechanical part, and the electromagnet apparatus and the elastic member are respectively disposed on two opposite sides of the baffle; and one of the electromagnet apparatus and the elastic member is configured to drive the baffle to move to the third position, and the other is configured to drive the baffle to move to the fourth position.

9. The electronic device according to claim 8, wherein when the electromagnet apparatus is powered on, the electromagnet apparatus applies an attraction force to the baffle to drive the baffle to move to the third position; or when the electromagnet apparatus is powered off, the elastic member retracts to apply a pulling force to the baffle to drive the baffle to move to the fourth position.

10. The electronic device according to claim 7, wherein the second driving assembly comprises a motor and a transmission gear, the baffle comprises a rack portion disposed at one end, close to the motor, of the baffle, the transmission gear is disposed at an output end of the motor, and the transmission gear meshes with the rack portion.

11. The electronic device according to claim 1, wherein the electronic device further comprises a light-transmitting support plate, the light-transmitting support plate is disposed in the second housing and is located between the dimming module and the first display, and the first display is attached to the light-transmitting support plate.

* * * * *